(12) United States Patent
Dumey

(10) Patent No.: US 12,333,880 B1
(45) Date of Patent: Jun. 17, 2025

(54) SECURE ITEM DROPOFF AND RETRIEVAL

(71) Applicant: Amazon Technologies, Inc., Seattle, WA (US)

(72) Inventor: Adam Dumey, Falls Church, VA (US)

(73) Assignee: Amazon Technologies, Inc., Seattle, WA (US)

(*) Notice: Subject to any disclaimer, the term of this patent is extended or adjusted under 35 U.S.C. 154(b) by 282 days.

(21) Appl. No.: 18/079,718

(22) Filed: Dec. 12, 2022

(51) Int. Cl.
| | | |
|---|---|---|
| G07C 9/29 | (2020.01) | |
| G06V 20/52 | (2022.01) | |
| G07C 9/10 | (2020.01) | |
| G07C 9/25 | (2020.01) | |
| G07C 9/28 | (2020.01) | |

(52) U.S. Cl.
CPC ............. *G07C 9/29* (2020.01); *G06V 20/52* (2022.01); *G07C 9/10* (2020.01); *G07C 9/25* (2020.01); *G07C 9/28* (2020.01)

(58) Field of Classification Search
CPC ... G07C 9/29; G07C 9/10; G07C 9/25; G07C 9/28; G06V 20/52; G05B 19/00; G05B 23/00; A61G 12/00; G06T 7/246; G06T 7/292
USPC .................................................. 340/5.73, 5.7
See application file for complete search history.

(56) References Cited

U.S. PATENT DOCUMENTS

| | | | |
|---|---|---|---|
| 9,078,797 B2* | 7/2015 | Shoenfeld | E05B 17/22 |
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,127,754 B2* | 11/2018 | Child | G07C 9/00563 |
| 10,581,870 B2* | 3/2020 | Shen | H04L 63/0492 |
| 10,600,264 B2* | 3/2020 | Kayhani | G06V 40/16 |
| 10,708,410 B2* | 7/2020 | Gerhardt | H04W 12/50 |
| 11,069,070 B2* | 7/2021 | Buibas | G06V 40/103 |
| 11,462,069 B2* | 10/2022 | Vilhelmsen | G07C 9/28 |
| 11,676,433 B2* | 6/2023 | Nam | G07C 9/247 340/5.7 |
| 11,770,708 B2* | 9/2023 | Pirch | G06Q 10/1095 340/5.65 |
| 11,961,344 B2* | 4/2024 | Kincaid | G07C 9/00309 |
| 12,056,658 B1* | 8/2024 | Ramoji | G06Q 10/087 |
| 2013/0284806 A1 | 10/2013 | Margalit | |
| 2018/0298670 A1* | 10/2018 | Shomsky | E05F 15/79 |
| 2023/0098243 A1* | 3/2023 | Dhawan | G06Q 10/087 705/14.27 |

* cited by examiner

*Primary Examiner* — Nam V Nguyen
(74) *Attorney, Agent, or Firm* — Athorus, PLLC

(57) ABSTRACT

This disclosure describes, in part, systems and techniques for secure storage and retrieval of items by users without requiring manual check-in and check-out procedures. The systems and techniques involve tracking locations (anonymously) of users within a facility and associating locations where the user placed items with a unique identifier. The item is secured except for access by the user as gates or panels prevent accessing items or exiting with items other than those associated with the user.

18 Claims, 8 Drawing Sheets

SECURE ITEM DROPOFF AND RETRIEVAL

BACKGROUND

Many different approaches are known to uniquely identify and track physical objects during different operations such as travel, drop off, storage, pickup, and other such operations, including labeling and tagging strategies using serial numbers, barcodes, holographic labels, RFID tags, and hidden patterns using security inks or special fibers. All currently known approaches rely on applied identifiers and human receiving counterparts to accept and process items to fully prevent introduction of or unauthorized removal of items in an item storage system. In addition, many applied identifiers and additional interactions and processing add substantial costs to the production, storage, and/or transportation of the objects sought to be identified, stored, and tracked.

BRIEF DESCRIPTION OF FIGURES

The detailed description is set forth with reference to the accompanying figures. The use of the same reference numbers in different figures indicates similar or identical items or features.

DETAILED DESCRIPTION

Figure 1:
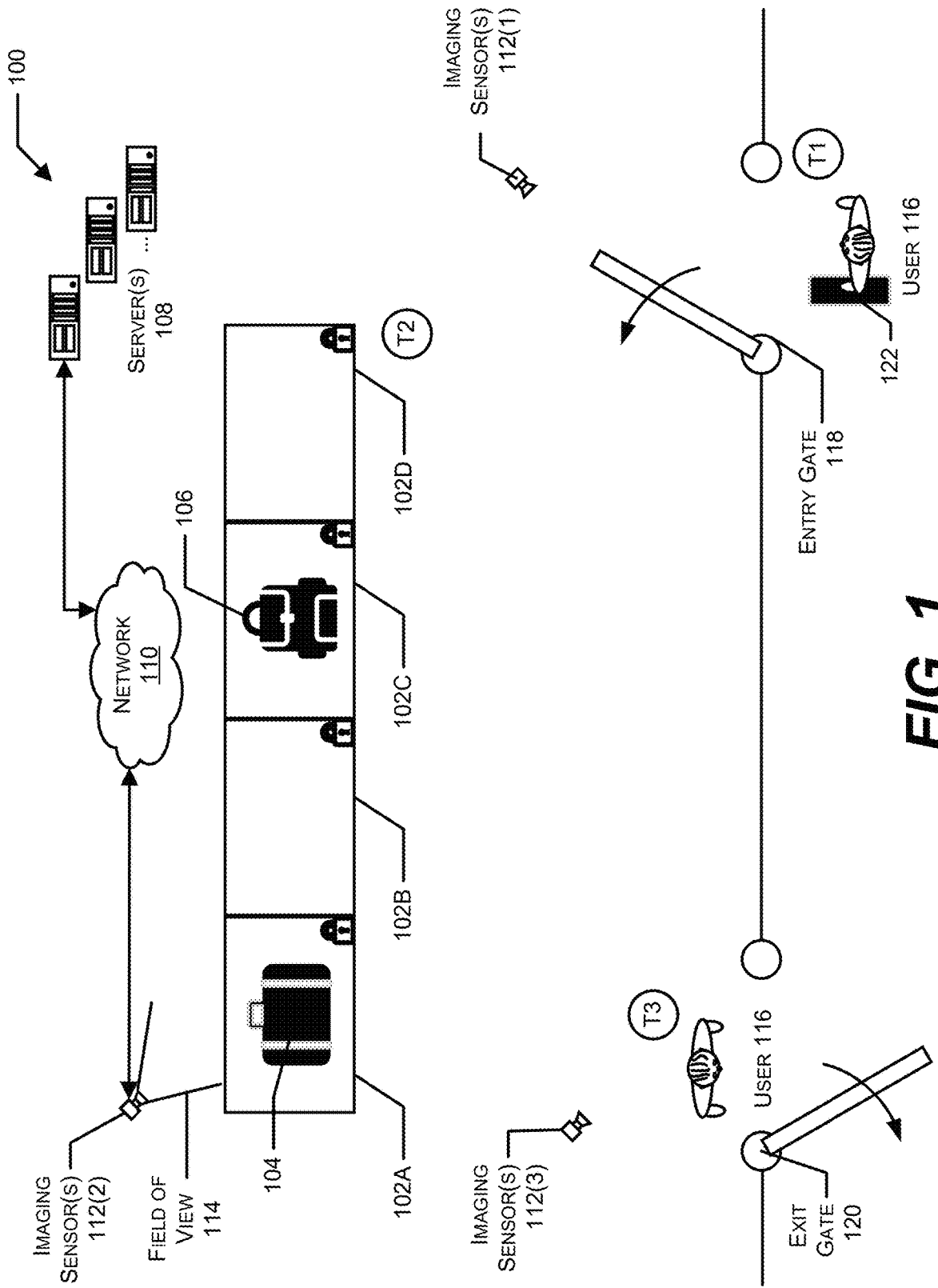
FIG. 1 illustrates an example facility associated with a system for enabling automated access and securing of items in storage locations that users may access to store and remove items without performing a manual check-in or manual check-out process, according to at least one example.

This disclosure describes, in part, systems and techniques for item storage and retrieval at various locations and facilities. For example, items may be stored at locations such as hotels, airports, train stations, depots, rental equipment locations, and other such facilities and/or locations where items may be stored and/or accessed based on specific access to particular individuals. The systems and techniques described herein provide secure access for individuals to check-in and check-out items at secure storage locations without requiring a manual check-in or manual check-out process as is typically performed.

The systems and techniques provided herein may determine a user account associated with a user who entered a facility based at least in part on sensor data, such as sensor data from one or more cameras, mobile devices, biometric data, or other such identifying information. The users may be tracked within the facility in a privacy-preserving manner by applying a token that maintains the location of the user within the facility based on data from one or more sensors including cameras, RFID sensors, and other such devices that may be used to track user locations within a facility.

By using this technology, a user is able to store items in a storage location (e.g., shelves, racks, cases, cabinets, bins, floor locations, etc.) and exit the facility without performing manual checkout and may also access the stored items from the storage locations without performing a manual checkout. For instance, a system may use sensors located within a facility, such as cameras, to determine locations of a user as (and/or after) the user navigates throughout the facility. The system may further use sensors located within the facility, such as signal receivers, to determine locations of an item throughout the facility.

The storage locations may be secured using locks or other securable doors or access panels that may be configured to lock and/or unlock based on specific access permissions associated with a user account. For instance, the sensors of the facility may be used to track the location of the user as well as to track the location of an item stored at a storage location and/or accessed from a storage location. The location of the user may be used to unlock one or more access panels or gates based on proximity of the user to access panels and/or gates that the user account includes permissions and/or access to open. In this manner, the user may approach a storage location, place an item, shut an access of the storage location, and walk away. The item stored in the storage location is secured by the system automatically upon the user walking away from the storage location and may be released or accessed in response to the sensors of the system detecting that the user is within a predetermined distance of the storage location, which may be the same location where the item was deposited and/or may be a different location in an instance of items being transported by a third-party, such as airline baggage claim check-in and pick-up.

In some examples, the storage locations may be recommended to a user based on sensor data within the facility. For example, the sensor data may include image data that detects a shape and/or size of a bag and recommends a storage space to the user based on the size and/or shape. The recommendation may be provided to the user through a mobile application. In this manner, the storage spaces may be used efficiently with spaces recommended that will use the storage spaces efficiently, e.g., without storing small items in large storage spaces etc.

With the fusion of the facility with the sensors, the user tracking, and the securable locations, the users are able to easily and seamlessly deposit items for storage and subsequently access the items without waiting in a line or queue for a manual checkout process as is typical. Additionally, no keys or combinations need to be learned, memorized, or kept by the user and instead the identity of the user (and the associated user account) is used to grant access to the storage location.

Though particular examples herein may be described with respect to a particular facility such as a hotel, the systems described herein may be used in a variety of other facilities and locations such as depots, rental locations, pharmacies, secure storage lockers, stores, airports, train stations, baggage claims, and other such locations.

In an illustrative example, the facility may include a storage room of a hotel where guest bags may be stored while waiting for check-in and/or after a check-out time. In the example, the guest may provide an authentication such as a credit card, mobile device scan, palm scan, fingerprint scan, biometric data, password, or other such information to open a door or gate to the storage room. Upon opening the door of the storage room, the system may log the entry time and identity and/or account of the user as part of an audit log. The system may identify, using one or more sensors such as one or more cameras of the storage room, a number of bags or items brought in with the user at the same time. In some examples, other sensors and or manual inputs may be used to identify the number of items brought into the storage room.

The one or more cameras of the system may track the location of the user and of the baggage within the storage room by applying a token to track the location of the user in a privacy-protecting manner. The one or more cameras may communicate image data to one or more systems associated with the facility. The systems may use item and/or individual tracking algorithms, models, or other systems, to determine the location of the user within the storage room.

When the user places their baggage in a storage location, such as on a shelf or within a locker of the storage room, the one or more cameras of the facility may identify an event associated with the placement of the baggage as well as a storage location of the baggage. The storage location may include an identification of a shelf, locker, cubby, closet, or other such location within the storage room where the baggage is placed by the user. For example, the system may identify that a user associated with user account "A" walked into the storage room at time "T1" with 2 bags and placed the two bags in lockers A and B.

The user may leave the lockers and/or other locations and the storage locations may lock automatically based on proximity of the user, as determined based on the image data from the one or more cameras of the storage room. For example, the storage location may automatically lock based on identifying that the user associated with a user account who placed an item in a storage location has moved more than five or ten feet from the storage location, and therefore the storage location may lock such that specific access is only granted to the user and the storage location is inaccessible to others. In some examples, the user may provide access permissions to other individuals such that a different individual may access a stored item within the storage room.

In some examples, the entrance and/or exit to the storage room may be outfitted with lanes to accommodate multiple guests and/or trips where bags are dropped off without creating unnecessary clutter. The lanes may enable multiple users to enter and/or exit the storage room simultaneously. Additionally, the lanes may have a security mechanism (e.g., locking gates) to prevent non-owners or unauthorized individuals from taking the bags that do not belong to them.

In some examples, after dropping the bag off, the guest would then provide the same authentication method used for entry to exit the storage room. The guest may also receive a confirmation, via a mobile device, including a communication on the mobile device and/or through an application, that the bags were successfully dropped off and secured. The message may also include the storage location and other such information.

When the guest returns to pick up the baggage from the storage location, they would follow a similar entry protocol (e.g., use the same authentication model used during drop-off) to enter the storage room. Upon entry, the system of cameras and other sensors may determine a match between the identity of the person entering the room, a user account, the storage location, the number of bags, and other such information. The system may then release and/or unsecure the storage location in response to the person entering the storage room and/or approaching within a threshold distance of the storage location. This release may include a release of various security mechanisms such as gates, doors, locks, and other such access panels or access restricting devices. After retrieving the baggage, the guest may then proceed to the exit and exit using the exit location.

In some examples, the exit location may verify the identity of the guest, the user account, the number of bags, the visual appearance of the bags, the storage location the bags were retrieved from, and other such information before opening the exit to allow the guest to exit with the baggage. If the information verified by the system is correct then the exit may open and the guest may leave. After exiting the storage room, the guest may receive a confirmation via the mobile device that the bags were successfully retrieved.

In some examples, the guest may drop-off the baggage in the storage room as described herein but may not be available to retrieve the baggage or may be intentionally leaving the baggage or items for a second individual to access at a later time. In such examples, the guest may provide personalized access to the second individual through the system by linking a user account of the second individual with the baggage. For instance, in some examples, a mobile device may be used to add the user account of the second individual or otherwise identify the second individual after drop-off such that the second individual may be identified and associated with the baggage at the storage location when they arrive to retrieve the items.

In some examples, the system may enable a user to reserve a storage space and/or for the system to determine a location for the user to store items either on arrival at the location and/or in advance of arrival. For example, the user may use a mobile device to input a request for a reservation of a storage space of a particular size and/or shape in advance of arrival and the storage space may be reserved and the system may prevent others from accessing the space for a period of time before the reserved arrival time for the user.

In some examples, the system may produce an audit log of transactions occurring within the storage room such as user accounts associated with individuals that entered the room, bags or items dropped off (e.g., number of bags and/or type, size, or other bag identifying information), storage locations where the bags are stored, routes users traversed within the storage room, interactions with bags that may be unsecured, and other such information. The audit log may be used to ensure security and provide a reviewable log of all interactions with the items in the storage room for security purposes. In some examples, if the guest or user interacts with items within the room that are not associated with the guest or the user then the exit may prevent the guest from exiting until some check has been performed, for example by alerting a security team. The audit log may include a log of open and closes of storage spaces as well as an identity of an individual accessing the space (e.g., based on their entry information to the facility such as a user account). In some examples, the audit log may also include a log of tracking the user within the facility, for example to track points visited within the facility, even if the user only opens or accesses a single storage space. In this manner, potential interactions and/or tampering with other items or storage spaces may be detected.

In some examples, the drop-off location within the storage room and the pick-up location for the baggage may be different locations. For instance, in an illustrative example including baggage during travel, a user may drop-off one or more items at a baggage check-in before boarding an airplane or train. Upon reaching the destination, the user may enter a different location to retrieve the items. In such examples, the items may be within secured storage containers that may be filled with baggage, secured as described herein, and loaded onto the airplane or train. The storage containers may be mobile and therefore may be securable as well as mobile to enable the user to retrieve the secure items at the destinations and ensure complete security of the item during transit as well as automation of the drop-off and pick-up flows. In some examples, automated devices such as conveyors and other machinery may also move or transport the storage containers from the first location to a second location (e.g., on the airplane) and subsequently from the second location to the pick-up location.

In some examples, the user may only engage in one of a drop-off and/or a pick-up of an item using the systems and techniques described herein. For example, a user may use the system to drop-off items in a secure manner that may be retrieved by a different individual and/or may pick-up items dropped-off by a different individual.

One general aspect includes a system having one or more cameras located within a facility configured to generate image data representing a user within the facility, one or more processors, and one or more computer-readable media storing instructions that, when executed by the one or more processors, cause the one or more processors to perform various operations. The operations may include receiving first sensor data associated with the user entering the facility at a first time and determining a user account associated with the user based at least in part on the first sensor data. The operations may also include receiving second sensor data from the one or more cameras indicating an event may include a user interaction with an item and a storage location within the facility and determining a location within the facility for the storage location. The operations may further include securing the item within the facility in response to the user exiting the facility, wherein the item is not accessible to a second user different from the user. Other embodiments of this aspect include corresponding computer systems, apparatus, and computer programs recorded on one or more computer storage devices, each configured to perform the operations described herein.

Implementations may include one or more of the following features. The system may include securable doors providing access to respective storage compartments, and wherein securing the item may include locking the securable doors, the securable doors unlockable in response to the user entering the facility and approaching the storage location. The operations further may include receiving third sensor data associated with the user returning to the facility at a second time later than the first time, determining the user account based at least in part on the third sensor data, and releasing the item in response to determining that the user approaches the storage location based at least in part on fourth sensor data.

One general aspect includes a method for secure item drop-off and/or retrieval. The method includes determining a user account associated with a user within a facility based at least in part on first sensor data. The method also includes determining a location of an event within the facility based at least in part on second sensor data, the event may include a user deposit of an item. The method further includes determining a user permission for accessing the item at the location and securing the item within the facility in response to the user exiting the facility, where the item is not accessible to a second user having a second user account with second user permission different from the user permission. Other embodiments of this aspect include corresponding computer systems, apparatus, and computer programs recorded on one or more computer storage devices, each configured to perform the actions of the methods.

Implementations may include one or more of the following features. The method may include determining a user location within the facility, and securing the item may include locking an access panel to the location automatically in response to the user being more than a threshold distance away from the location, the access panel lockable based on a determination of the user account of the user and a proximity of the user to the access panel. Determining the user location may include receiving sensor data from one or more cameras within the facility, determining a token associated with a representation of the user within the sensor data; and the proximity of the user to the access panel is based at least in part on the token. Securing the item may include closing and locking an access gate providing access into at least a portion of the facility may include the location, the access gate unlockable based at least on the user account in response to the user being within a threshold distance of the access gate. The method may further include enabling access to the location based at least in part on the user approaching the location, identifying the user based at least in part on image data from one or more cameras of the facility, and determining the user account in response to identifying the user. Enabling access based at least in part on the user approaching the location may include unlocking an access panel providing access to the location based at least in part on proximity of the user to the location. The method may include the user accessing the item by approaching a secure storage location, the secure storage location different from the location and in response to the user approaching the secure storage location. The method may include determining an audit log of accesses to the facility and the location and associated user accounts of users who accessed the facility and the location. The method may include generating a notification to a mobile device associated with the user account, the notification may include information regarding the location or a pickup time for the item. The method may include receiving a message from a mobile device associated with the user account at a time prior to the user entering the facility, the message may include a request to reserve a storage location, and reserving access to the storage location based at least in part on the message by preventing subsequent users to place an item at the storage location. The method may include determining a secondary user to access the location based at least in part on a message from a mobile device associated with the user account, the secondary user receiving permission to access the location by approaching the location and being identified based at least in part on sensor data from one or more cameras of the facility.

Implementations of the described techniques may include hardware, a method or process, or computer software on a computer-accessible medium.

Turning now to the figures, FIG. 1 illustrates an example facility 100 associated with a system for enabling automated access and securing of items in storage locations that users may access to store and remove items without performing a manual check-in or manual check-out process, according to at least one example. In the facility 100, items such as item 104 and item 106 may be stored in storage locations 102A, 102B, 102C, and 102D (collectively "storage locations 102"). The storage locations 102 may include lockers, boxes, cabinets, cubbies, totes, boxes, compartments, and other such areas that may be securable through one or more securing means such as a door, lock, lid, or other such item. In some examples, the storage locations 102 may include regions within an open storage room including open shelving or other such storage facilities.

The facility 100 and the storage locations 102 are configured to store the items 104 and 106. The storage area locations 102 may be arranged in various physical configurations. In one implementation, the storage locations 102 may include one or more aisles. The aisle may be configured with, or defined by, storage locations 102 on one or both sides of the aisle. The storage locations 102 may include one or more of shelves, racks, cases, cabinets, bins, floor locations, or other suitable storage mechanisms for holding or storing the items. The storage locations 102 may be affixed to the floor or another portion of the facility's structure, or may be movable such that the arrangements of aisles may be reconfigurable. In some implementations, the storage locations 102 may be configured to move independently of an outside operator. For example, the storage locations 102 may comprise a rack with a power source and a motor, operable by a computing device to allow the rack to move from one location within the facility 100 to another.

One or more users 116 may move within the facility 100. For example, the users 116 may move about within the facility 100 to pick or drop off items at the storage locations 102. The users 116 may carry items 122 in through an entry gate 118 and may exit through an exit gate 120 after depositing the items 122 at the storage locations. The entry gate 118 and the exit gate 120 may include one or more sensors for determining an identity of the users 116 and/or other information such as a number of items 122, characteristics of the items 122, and other such information. Additionally, the entry gate 118 and the exit gate 120 may include interfaces for the user to identify and/or setup a user account. In some examples the user may identify their user account through the use of various authentication systems including mobile devices, biometric data, passcode information, credit card information, or other such data.

Within the facility 100, one or more sensors 112(1), 112(2), and 112(3) (collectively "sensors 112") may be configured to acquire information in the facility 100. The sensors 112 in the facility 100 may include sensors fixed in the environment (e.g., ceiling-mounted cameras) or otherwise, such as sensors in the possession of users (e.g., mobile phones, tablets, etc.). The sensors 112 may include, but are not limited to, image sensors, weight sensors, radio frequency (RF) receivers, temperature sensors, humidity sensors, vibration sensors, and so forth. The sensors 112 may be stationary or mobile, relative to the facility 100. For example, the storage locations 102 may contain sensors 112 configured to acquire images of pick-up or drop-offs of items on shelves, of the users 116 in the facility 100, and so forth. In another example, the floor of the facility 100 may include weight sensors configured to determine a weight of the users 116 or another object thereupon.

During operation of the facility 100, the sensors 112 may be configured to provide information suitable for tracking how objects move or other occurrences within the facility 100. For example, a series of images acquired by a sensor 112 may indicate removal of an item 104 from a particular storage location 102 by one of the users 116.

The facility 100 may include, or be coupled to, a server 108, which may perform some or all of the techniques described above with reference to FIGS. 1-7. For example, the server 108 may maintain a token for tracking locations of the users 116 within the facility 100 and may also identify events such as drop-off or pick-up events, and may also identify when to lock and/or unlock locations such as the storage locations 102 and/or the entry gate 118 and/or the exit gate 120. The server 108 may also store a record associated with each user indicating an identifier associated with the user, the location of the user, and whether the user is eligible to exit the facility 100 with one or more items. The server 108 may also generate and output notification data to the users 116, indicating whether or not they are so eligible.

As illustrated, the server 108 may reside at the facility 100 (e.g., as part of on-premises servers), remote from the facility 100, and/or a combination thereof. In each instance, the server 108 is configured to identify interactions and events with and between users 116, devices such as sensors 112, items, and storage locations 102. As described herein, some interactions may further indicate the existence of one or more events, or predefined activities of interest. For example, events may include the entry of the user 116 to the facility 100, drop-off of items at a storage location 102, picking of an item from a storage location 102, returning of an item to a storage location 102, movement of users 116 relative to one another, gestures by the users 116, and so forth. Other events involving users 116 may include the user 116 providing authentication information in the facility 100, using a computing device at the facility 100 to authenticate identity to the server 108, and so forth. Some events may involve one or more other objects within the facility 100.

By determining the occurrence of one or more of the events, the server 108 may generate output data. The output data comprises information about the event. For example, where the event comprises, an item being placed in a storage location 102 and/or removed from a storage location 102, the output data may comprise an item identifier indicative of the particular item that was removed from the storage location 102 and a user identifier of a user that removed the item.

The server 108 may use one or more automated systems to generate the output data. For example, an artificial neural network, one or more classifiers, or other automated machine learning techniques may be used to process the sensor data from the one or more sensors 112 to generate output data. For example, the server 108 may perform some or all of the techniques for generating and utilizing a classifier for identifying user activity in image data, as described in herein. The automated systems may operate using probabilistic or non-probabilistic techniques. For example, the automated systems may use a Bayesian network. In another example, the automated systems may use support vector machines to generate the output data or the tentative results. The automated systems may generate confidence level data that provides information indicative of the accuracy or confidence that the output data or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 80%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 104, user 116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

In some situations, the automated techniques may be unable to generate output data with a confidence level above a threshold result. For example, the automated techniques may be unable to distinguish which user 116 in a crowd of users 116 has picked up the item 104 from the storage location 102. In other situations, it may be desirable to provide human confirmation of the event or of the accuracy of the output data.

In instances where human confirmation is desired, sensor data associated with an event may be processed to generate inquiry data. The inquiry data may include a subset of the sensor data associated with the event. The inquiry data may also include one or more of one or more tentative results as determined by the automated techniques, or supplemental data. The subset of the sensor data may be determined using information about the one or more sensors 112. For example, camera data such as the location of the sensor 112 within the facility 100, the orientation of the sensor 112, and a field of view 114 of the sensor 112 may be used to determine if a particular location within the facility 100 is within the field of view 114. The subset of the sensor data may include images that may show the storage location 102 or that the item 104 was stowed. The subset of the sensor data may also omit images from other sensors 112 that did not have that storage location 102 in the field of view 114. The field of view 114 may comprise a portion of the scene in the facility 100 that the sensor 112 is able to generate sensor data about.

Continuing the example, the subset of the sensor data may comprise a video clip acquired by one or more sensors 112 having a field of view 114 that includes the item 104. The tentative results may comprise the "best guess" as to which items 104 may have been involved in the event. For example, the tentative results may comprise results determined by the automated system that have a confidence level above a minimum threshold.

The server 108 may access or generate sensor data about the facility 100 and the contents therein including the items, the users 116, and so forth. The sensor data may be acquired by one or more of the sensors 112, data provided by other systems, and so forth. For example, the sensors 112 may include sensors 112 configured to acquire image data of scenes in the facility 100. The image data may comprise still images, video, or a combination thereof. The image data may be processed by the server 108 to determine a location of the user 116, items, the identifier associated with the user 116, and so forth. As used herein, the identifier associated with the user may represent a unique identifier of the user (e.g., number associated with user, username, etc.), an identifier that distinguishes the user amongst other users being located within the environment, or the like.

The server 108, or systems coupled thereto, for example over network 110, may be configured to determine the identifier associated with the user 116, as well as to determine other candidate users. In some examples, the network 110 may include any one or a combination of multiple different types of networks, such as cable networks, the Internet, wireless networks, cellular networks, and other private and/or public networks. In one implementation, this determination may comprise comparing sensor data with previously stored identity data. For example, the identifier associated with the user 116 may be identified by presenting a token carrying authentication credentials, providing a fingerprint, scanning a barcode or other type of unique identifier upon entering the facility 100 through the entry gate 118, and so forth. The identifier associated with the user 116 may be determined before, during, or after entry to the facility 100. Determination of the user's identifier may comprise comparing sensor data associated with the user 116 in the facility 100 to previously stored user data.

In an example drop-off process, as illustrated in FIG. 1, the user 116 enters through the entry gate 118 at T1 by providing some identifying information such as a user account, authentication information, credit card, or other such information. The user 116 then enters the facility 100 and may be tracked (anonymously) within the facility 100 by the sensors 112 as they move to the storage locations 102 to deposit the item 122. The sensors 112 may identify a storage location 102 where the user 116 deposits the item 122. The storage location 102 may be associated with the user account of the user 116 and/or the item 122 such that the user may be directed to or enable to retrieve the item from the storage location at a later time.

After the user 116 deposits the item 122 at the storage location 102 at T2, the user may walk toward the exit gate 120. Upon the system within the facility 100 determining that the user is leaving the storage location 102 (e.g., when the user 116 is more than a threshold distance from the storage location 102), the server 108 may cause a lock or securable access panel associated with the storage location 102 to lock and thereby prevent unauthorized access to the item. The user 116 may not need to perform any action to lock the item other than simply walking away. Additionally, no key, code, or other information need be retained by the user.

In some examples, the storage location 102 may be secured when the user 116 exits the exit gate 120 at T3. In some examples, the user 116 provides user identifying information at the exit gate 120 which may include biometric data, image data from the sensors 112, credit card data, or other such information to identify the user 116 at the exit gate 120.

Figure 2:
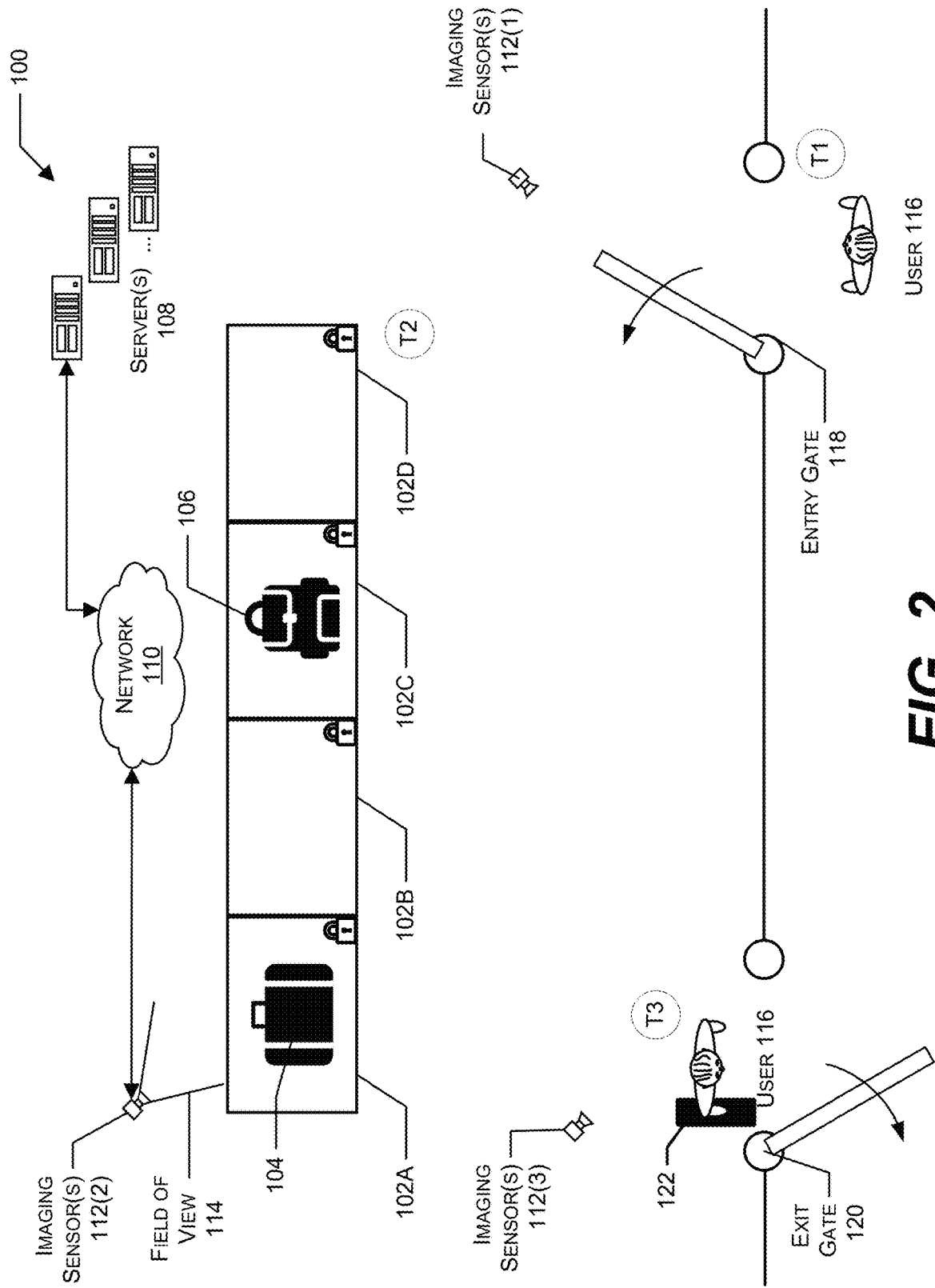
FIG. 2 illustrates an example facility associated with a system for enabling automated access and securing of items in storage locations that users may access to store and remove items without performing a manual check-in or manual check-out process, according to at least one example.

The item 122 and the storage location 102 may be uniquely associated with access tied to the user account of the user 116 that may be accessed as shown with respect to FIG. 2.

FIG. 2 illustrates an example facility associated with a system for enabling automated access and securing of items in storage locations that users may access to store and remove items without performing a manual check-in or manual check-out process, according to at least one example. The facility 100 of FIG. 2 may be the facility 100 of FIG. 1 and include the associated components described herein. The example of FIG. 1 may illustrate a drop-off of an item 122 while the example of FIG. 2 may illustrate a pick-up procedure for the item 122.

In an example, the user 116 may return to the facility 100 to retrieve an item 122 stored at a storage location 102. At T1, the user 116 enters through the entry gate 118 by providing or presenting themself and/or authentication methods such as a mobile device, biometric data, credit card, or other such information. The entry gate 118 may allow the user 116 to enter after identifying a user account of the user 116. The user account may be associated with a storage location 102 where the item 122 was previously stored. The user account may include unique access to the storage location 102 where the item 122 is stored and/or may include access to one or more additional authorized individuals by linking the access to their user accounts. In this manner, different users 116 may drop-off and pick-up the item 122.

After entering the facility 100, the user 116 may be tracked by the sensors 112 and approach the storage locations 102. The user 116 may approach the storage location either based on identifying the location where the item was stored from memory, based on a location of the storage locker indicated in a mobile application that provides information to the user associated with the user account, and/or through the use of visual indicators such as lights within the facility 100 that may illuminate and/or flash to identify a storage location 102 that the user 116 may have access to.

At T2, the user 116 may retrieve the item 122 from the storage location 102. As the user 116 enters the facility 100 and comes within a predetermined distance of the storage location 102 (as determined based on the sensors 112), the server 108 may cause the storage location 102 to unlock to enable the user 116 to access the contents. The server may cause the unlock in response to determining that the user 116 is associated with a user account that has permission and/or access to the item stored in the storage location 102. In some examples, multiple of the storage locations 102A, 102B, 102C, and/or 102D may be unlocked based on the accesses and permissions associated with the user 116.

After retrieving the item 122 at T2, the user 116 may proceed to the exit gate 120 at T3, where the server 108 may verify the identity of the user 116 and/or information associated with the item to verify that the user 116 is exiting with the item 122 that was stored in the storage location 102, providing additional layers of security to ensure users 116 get their secured items without being able to access or leave without other items.

Figure 3:
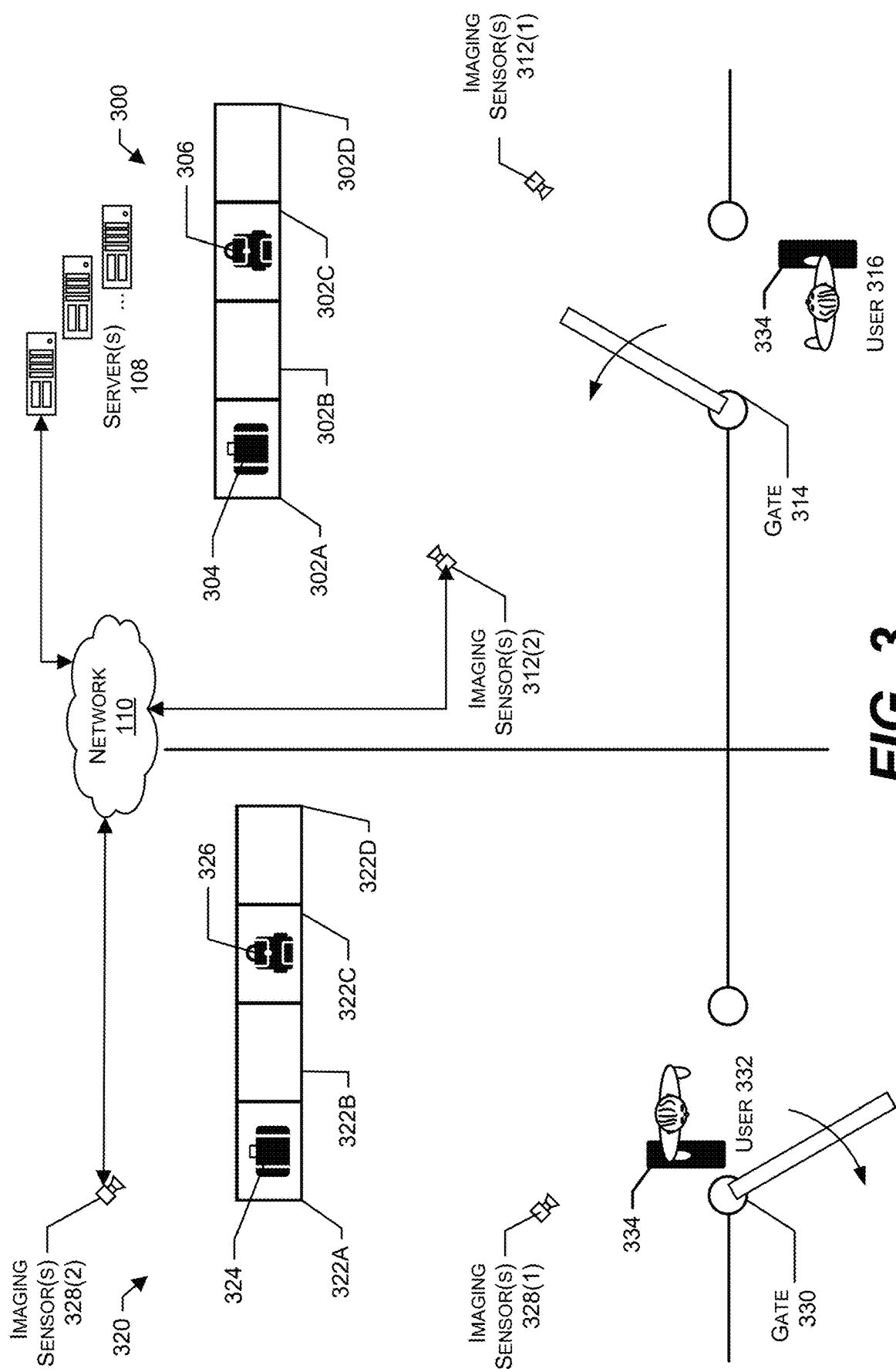
FIG. 3 illustrates an example system for securely accessing items transported by a third party between locations without performing a manual check-in or manual check-out process, according to at least one example.

FIG. 3 illustrates an example system for securely accessing items transported by a third party between locations without performing a manual check-in or manual check-out process, according to at least one example. The system includes a first facility 300 and a second facility 300. The system may be used to transport an item securely between the first facility 300 and the second facility 300 and/or also to enable a user 316 to drop-off an item 334 and pick-up the item 224 without requiring a manual check-in and/or check-out procedure.

The first facility 300 includes components described above with respect to the facility 100 such as storage locations 302A, 302B, 302C, and 302D (collectively "storage locations 302") where items 304 and 306 are stored that may be similar or identical to the storage locations 102. The first facility 300 also includes sensors 312 that may be similar or identical to the sensors 112 of FIG. 1 and a gate 314 that may function in a similar manner to both the entry gate 118 and the exit gate 120 as described herein.

The second facility 320 may also include components described above with respect to facility 100 such as storage locations 322A, 322B, 322C, and 322D (collectively "storage locations 322") where items 324 and 326 are stored that may be similar or identical to the storage locations 102. The second facility 320 also includes sensors 328 that may be similar or identical to the sensors 112 of FIG. 1 and a gate 330 that may function in a similar manner to both the entry gate 118 and the exit gate 120 as described herein.

The first facility 300 and the second facility 320 may each communicate with the server 108 as described herein over the network, including the internet, to enable a transaction and access to user account information at different locations.

In operation, the user 316 may drop off an item 334 at the first facility 300 using a process similar to that described above. In an example drop-off process at the first facility 300, the user 316 enters through the gate 314 at by providing some identifying information such as a user account, authentication information, credit card, or other such information. The user 316 then enters the first facility 300 and may be tracked (anonymously) within the facility 300 by the sensors 312 as they move to the storage locations 302 to deposit the item 334. The sensors 312 may identify a storage location 302 where the user 316 deposits the item 334. The storage location 302 may be associated with the user account of the user 316 and/or the item 322 such that the user may be directed to or enable to retrieve the item from the storage location at a later time.

After the user 316 deposits the item 334 at the storage location 302, the user 316 may walk toward the gate 314. Upon the system within the first facility 300 determining that the user 316 is leaving the storage location 302 (e.g., when the user 316 is more than a threshold distance from the storage location 302), the server 108 may cause a lock or securable access panel associated with the storage location 302 to lock and thereby prevent unauthorized access to the item. The user 316 may not need to perform any action to lock the item other than simply walking away. Additionally, no key, code, or other information need be retained by the user.

In some examples, the storage location 302 may be secured when the user 316 exits the gate 314. In some examples, the user 316 provides user identifying information at the gate 314 which may include biometric data, image data from the sensors 312, credit card data, or other such information to identify the user 316 at the gate 314. In some examples, the gate 314 and/or the gate 330 may include multiple lanes or different exit and entrance lanes to enable multiple users 316 to enter and exit simultaneously.

The item 334 and the storage location 302 may be uniquely associated with access tied to the user account of the user 316 so that the user 332 may access the item 334 at the second facility 320. A vendor, such as a transportation company, may transport the storage location 302, such as by loading a locking tote or other such compartment into a vehicle, airplane, train, boat, or other system and transporting to unload at the second facility 320. At the second facility 320, a user 332, who may be the same as user 316 or may be a different user who was granted access to receive the item 334 may retrieve the item from the storage location without requiring a manual check-in process.

In an example, the user 332 may enter the second facility 320 to retrieve the item 334 stored at a storage location 322 (e.g., which is a transported storage location 302 after arriving at the second facility 320). The user 332 enters through the gate 330 by providing or presenting themself and/or authentication methods such as a mobile device, biometric data, credit card, or other such information. The gate 330 may allow the user 332 to enter after identifying a user account of the user 332. The user account may be associated with a storage location 302 and/or 322 where the item 334 was previously stored. The user account may include unique access to the storage location 302 where the item 334 is stored and/or may include access to one or more additional authorized individuals by linking the access to their user accounts. In this manner, different users may drop-off and pick-up the item 334.

After entering the second facility 320, the user 332 may be tracked by the sensors 328 and approach the storage locations 322. The user 332 may approach the storage location 322 either based on identifying the location where the item was stored from memory, based on a location of the storage locker indicated in a mobile application that provides information to the user associated with the user account, and/or through the use of visual indicators such as lights within the facility 320 that may illuminate and/or flash to identify a storage location 322 that the user 332 may have access to.

The user 332 may retrieve the item 334 from the storage location 322. As the user 332 enters the facility 320 and comes within a predetermined distance of the storage location 322 (as determined based on the sensors 328), the server 108 may cause the storage location 322 to unlock to enable the user 332 to access the contents. The server 108 may cause the unlock in response to determining that the user 332 is associated with a user account that has permission and/or access to the item stored in the storage location 322.

After retrieving the item 334, the user 332 may proceed to the gate 330, where the server 108 may verify the identity of the user 332 and/or information associated with the item 334 to verify that the user 332 is exiting with the item 334 that was stored in the storage location 322, providing additional layers of security to ensure users 332 get their secured items without being able to access or leave without other items.

Figure 4:
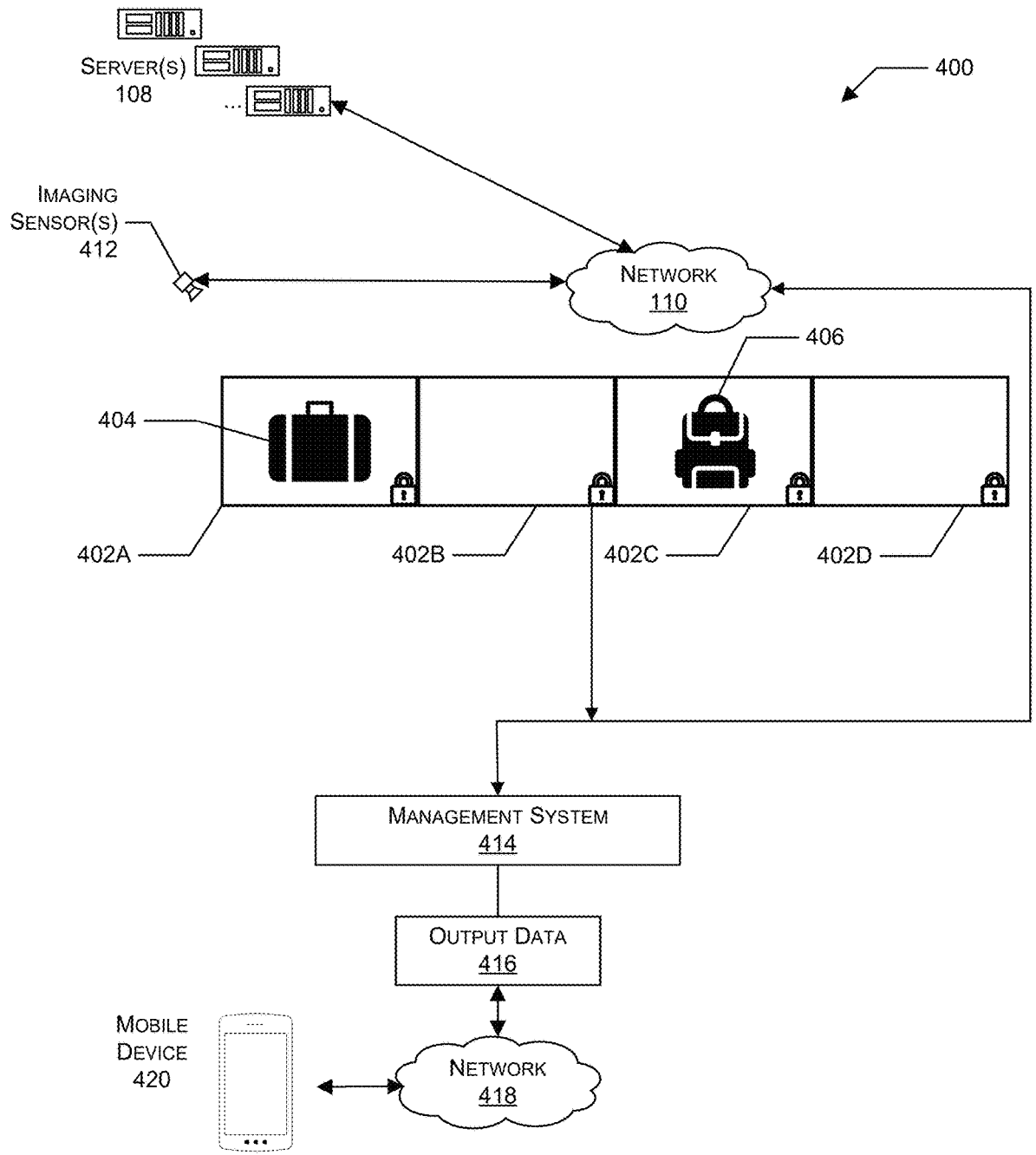
FIG. 4 illustrates an example system architecture for enabling automated access and securing of items in storage locations that users may access to store and remove items without performing a manual check-in or manual check-out process, according to at least one example.

FIG. 4 illustrates an example system architecture for enabling automated access and securing of items in storage locations that users may access to store and remove items without performing a manual check-in or manual check-out process, according to at least one example. In the facility 400, items such as item 404 and item 406 may be stored in storage locations 402A, 402B, 402C, and 402D (collectively "storage locations 402"). The storage locations 402 may include lockers, boxes, cabinets, cubbies, totes, boxes, compartments, and other such areas that may be securable through one or more securing means such as a door, lock, lid, or other such item. In some examples, the storage locations 402 may include regions within an open storage room including open shelving or other such storage facilities.

The facility 400 and the storage locations 402 are configured to store the items 404 and 406. The storage area locations 402 may be arranged in various physical configurations. In one implementation, the storage locations 402 may include one or more aisles. The aisle may be configured with, or defined by, storage locations 402 on one or both sides of the aisle. The storage locations 402 may include one or more of shelves, racks, cases, cabinets, bins, floor locations, or other suitable storage mechanisms for holding or storing the items. The storage locations 402 may be affixed to the floor or another portion of the facility's structure, or may be movable such that the arrangements of aisles may be reconfigurable. In some implementations, the storage locations 402 may be configured to move independently of an outside operator. For example, the storage locations 402 may comprise a rack with a power source and a motor, operable by a computing device to allow the rack to move from one location within the facility 400 to another.

Within the facility 400, one or more sensors 412 may be configured to acquire information in the facility 400. The sensors 412 in the facility 400 may include sensors fixed in the environment (e.g., ceiling-mounted cameras) or otherwise, such as sensors in the possession of users (e.g., mobile phones, tablets, etc.). The sensors 412 may include, but are not limited to, image sensors, weight sensors, radio frequency (RF) receivers, temperature sensors, humidity sensors, vibration sensors, and so forth. The sensors 412 may be stationary or mobile, relative to the facility 400. For example, the storage locations 402 may contain sensors 412 configured to acquire images of pick-up or drop-offs of items on shelves, of the users in the facility 400, and so forth. In another example, the floor of the facility 400 may include weight sensors configured to determine a weight of the users or another object thereupon.

During operation of the facility 400, the sensors 412 may be configured to provide information suitable for tracking how objects move or other occurrences within the facility 400. For example, a series of images acquired by a sensor 412 may indicate removal of an item 404 from a particular storage location 402 by one of the users.

The facility 400 may include, or be coupled to, a server 108, which may perform some or all of the techniques described herein with reference to FIGS. 1-7. A management system 414 may enable various actions, such as tracking of locations for users and items, determining authentication information, and identifying events within the facility 400. For example, the server 408 may maintain a token for tracking locations of the users within the facility 400 and may also identify events such as drop-off or pick-up events, and may also identify when to lock and/or unlock locations such as the storage locations 402. The management system 414 may communicate with the storage locations 402 as well as locks associated therewith. The server 408 may also store a record associated with each user indicating an identifier associated with the user, the location of the user, and whether the user is eligible to exit the facility 400 with one or more items. The server 408 may also generate and output notification data to the users, indicating whether or not they are so eligible.

As illustrated, the server 108 may reside at the facility 400 (e.g., as part of on-premises servers), remote from the facility 400, and/or a combination thereof. In each instance, the server 408 is configured to identify interactions and events with and between users, devices such as sensors 412, items, and storage locations 402. As described herein, some interactions may further indicate the existence of one or more events, or predefined activities of interest. For example, events may include the entry of the user to the facility 400, drop-off of items at a storage location 402, picking of an item from a storage location 402, returning of an item to a storage location 402, movement of users relative to one another, gestures by the users, and so forth. Other events involving users may include the user providing authentication information in the facility 400, using a computing device at the facility 400 to authenticate identity to the server 408, and so forth. Some events may involve one or more other objects within the facility 400.

By determining the occurrence of one or more of the events, the management system 414 may generate output data 416. The output data 416 comprises information about the event. For example, where the event comprises, an item being placed in a storage location 402 and/or removed from a storage location 402, the output data 416 may comprise an item identifier indicative of the particular item that was removed from the storage location 402 and a user identifier of a user that removed the item. The output data may be conveyed and/or shared with one or more additional devices including a mobile device 420 associated with the user.

The management system 414 may use one or more automated systems to generate the output data 416. For example, an artificial neural network, one or more classifiers, or other automated machine learning techniques may be used to process the sensor data from the one or more sensors 412 to generate output data. For example, the management system 414 may perform some or all of the techniques for generating and utilizing a classifier for identifying user activity in image data, as described in herein. The automated systems may operate using probabilistic or non-probabilistic techniques. For example, the automated systems may use a Bayesian network. In another example, the automated systems may use support vector machines to generate the output data or the tentative results. The automated systems may generate confidence level data that provides information indicative of the accuracy or confidence that the output data or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 80%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 404, user, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

In some situations, the automated techniques may be unable to generate output data 416 with a confidence level above a threshold result. For example, the automated techniques may be unable to distinguish which user in a crowd of users has picked up the item 404 from the storage location 402. In other situations, it may be desirable to provide human confirmation of the event or of the accuracy of the output data.

In instances where human confirmation is desired, sensor data associated with an event may be processed to generate inquiry data. The inquiry data may include a subset of the sensor data associated with the event. The inquiry data may also include one or more of one or more tentative results as determined by the automated techniques, or supplemental data. The subset of the sensor data may be determined using information about the one or more sensors 412. For example, camera data such as the location of the sensor 412 within the facility 400, the orientation of the sensor 412, and a field of view of the sensor 412 may be used to determine if a particular location within the facility 400 is within the field of view. The subset of the sensor data may include images that may show the storage location 402 or that the item 404 was stowed. The subset of the sensor data may also omit images from other sensors 412 that did not have that storage location 402 in the field of view. The field of view may comprise a portion of the scene in the facility 400 that the sensor 412 is able to generate sensor data about.

Continuing the example, the subset of the sensor data may comprise a video clip acquired by one or more sensors 412 having a field of view that includes the item 404. The tentative results may comprise the "best guess" as to which items 404 may have been involved in the event. For example, the tentative results may comprise results determined by the automated system that have a confidence level above a minimum threshold.

The management system 414 may access or generate sensor data about the facility 400 and the contents therein including the items, the users, and so forth. The sensor data may be acquired by one or more of the sensors 412, data provided by other systems, and so forth. For example, the sensors 412 may include sensors 412 configured to acquire image data of scenes in the facility 400. The image data may comprise still images, video, or a combination thereof. The image data may be processed by the server 408 to determine a location of the user, items, the identifier associated with the user, and so forth. As used herein, the identifier associated with the user may represent a unique identifier of the user (e.g., number associated with user, username, etc.), an identifier that distinguishes the user amongst other users being located within the environment, or the like.

The management system 414, or systems coupled thereto, for example over network 110, may be configured to determine the identifier associated with the user, as well as to determine other candidate users. In one implementation, this determination may comprise comparing sensor data with previously stored identity data. For example, the identifier associated with the user may be identified by presenting a token carrying authentication credentials, providing a fingerprint, scanning a barcode or other type of unique identifier upon entering the facility 400 through an entry, and so forth. The identifier associated with the user may be determined before, during, or after entry to the facility 400. Determination of the user's identifier may comprise comparing sensor data associated with the user in the facility 400 to previously stored user data.

Figure 5:
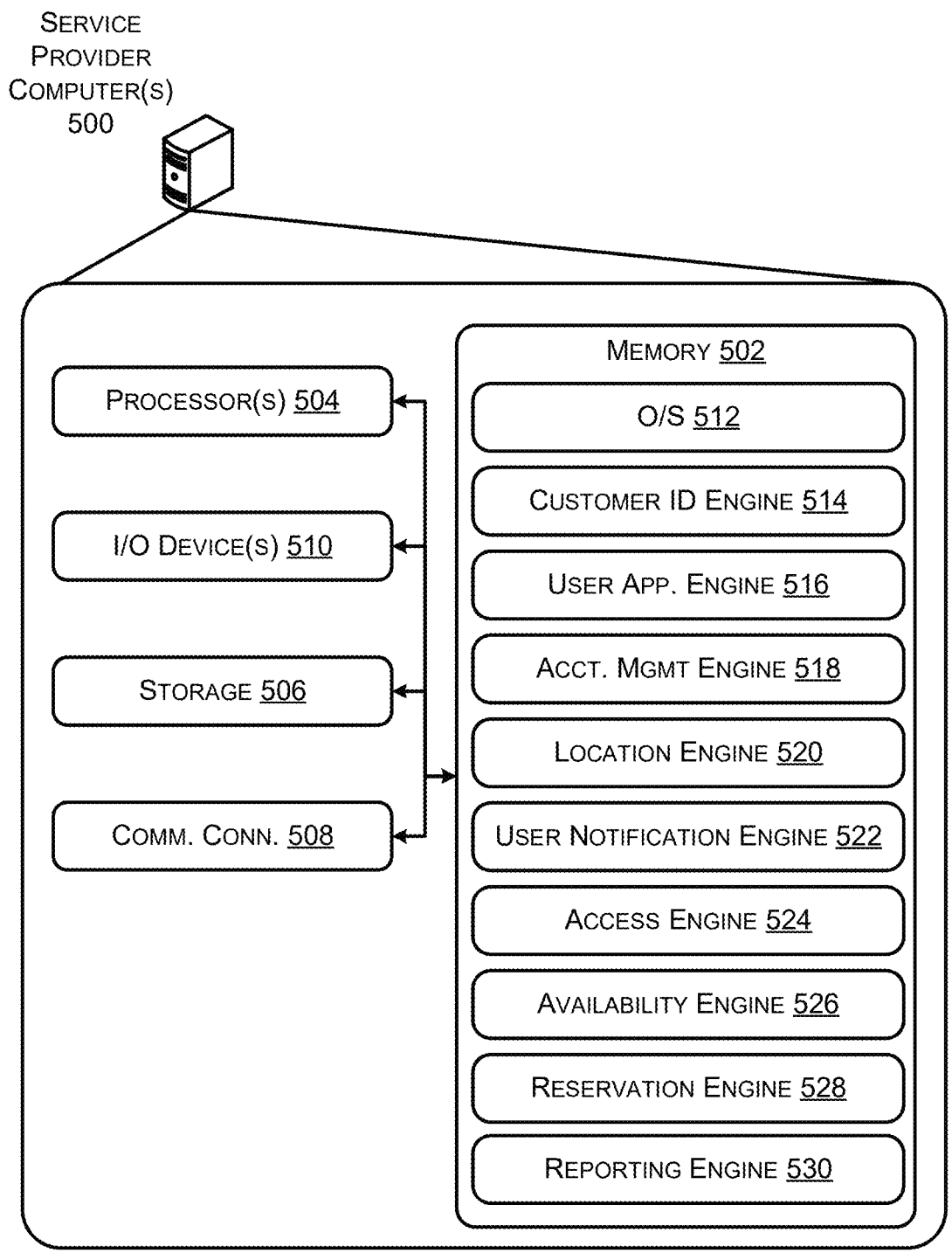
FIG. 5 illustrates an example computing device for carrying out one or more processes and functions as described herein, according to at least one example.

FIG. 5 illustrates an example computing device 500 for carrying out one or more processes and functions as described herein, according to at least one example. In some examples, the techniques described herein may be carried out on a distributed system while in some examples the techniques may be carried out on a single computing system. In some examples, service provider computer(s) 500 may represent the server 108 of FIGS. 1-4 and may provide functionality described therewith.

The service provider computer(s) 500 may include any types of computing devices such as, but not limited to, mobile, desktop, thin-client, server, and/or cloud computing devices. In some examples, the service provider computer(s) 500 may be in communication with other systems such as sensors 112 and 412, management system 414, and as well as one or more user devices (not shown) through which a user may interact with the service provider computer(s) 500 to access the services provided thereby. In certain embodiments, the service provider computer(s) 500 may include one or more servers, perhaps arranged in a cluster, as a server farm, or as individual servers not associated with one another. These servers may be configured to host a website (or combination of websites) viewable via the user device and/or any suitable user application (e.g., a Web browser, a dedicated application, etc.) accessible by any number of users.

In one illustrative configuration, the service provider computer(s) 500 may include at least one memory 502 and one or more processing units (or processor(s) 504). The processor(s) 504 may be implemented as appropriate in hardware, software, firmware, or combinations thereof. Various implementations of the processor(s) 504 may include computer-executable or machine-executable instructions written in any suitable programming language to perform the various functions described. As a result of executing computer-executable instructions, the service provider computer(s) 500 may form special-purpose computers or particular machines configured to host and/or provide website and/or other network-based functionality to users.

The memory 502 may store program instructions that are loadable and executable on the processor(s) 504, as well as data generated during the execution of these programs. Depending on the configuration and type of service provider computer(s) 110, the memory 502 may be volatile (such as random-access memory ("RAM")) and/or non-volatile (such as read-only memory ("ROM"), flash memory, etc.). The service provider computer(s) 500 or servers may also include additional storage 144, which may include removable storage and/or non-removable storage. The additional storage 144 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 502 may include multiple different types of memory, such as static random-access memory ("SRAM"), dynamic random-access memory ("DRAM"), or ROM.

The memory 502 and/or the additional storage 506, both removable and non-removable, are all examples of computer-readable storage media. For example, computer-readable storage media may include volatile and non-volatile, removable, and non-removable media implemented in any method or technology for storage of information such as computer-readable instructions, data structures, program modules, or other data. The memory 502 and the additional storage 506 are all examples of computer-readable storage media.

The service provider computer(s) 500 may also contain communications connection(s) 508 that allow the service provider computer(s) 500 to communicate with a stored database, another computing device or server, user terminals, and/or other devices on the networks. The service provider computer(s) 500 may also include input/output ("I/O") device(s) 510, such as a keyboard, a mouse, a pen, a voice input device, a touch input device, a display, speakers, a printer, etc., that facilitate user interaction with the service provider computer(s) 500.

Turning to the contents of the memory 502 in more detail, the memory 502 may include an operating system ("OS") 512 and one or more application programs or services for implementing the features disclosed herein. The memory 502 also includes a customer identification engine 514, a user application engine 516, an account management engine 518, a location engine 520, a user notification engine 522, an access engine 524, an availability engine 526, a reservation engine 528, and a reporting engine 530. Though depicted as having discrete elements, the elements may be combined or arranged in other configurations to accomplish the systems and techniques described herein. The OS 512 may include one or more suitable applications and/or program modules that facilitate the general operation of the service provider computer(s) 500, as well as the execution of one or more of the additional application programs. The user application engine 516 may include one or more suitable applications and/or modules configured to generate, host, or otherwise provide a website or other program for interaction by a user.

In some examples, the customer identification engine 514 may be configured to determine and/or maintain customer and/or user account information. For example, the customer identification engine 514 may receive sensor data when the user enters the facility and may compare the sensor data against stored data associated with user accounts to identify a user account for the individual and/or to direct them to create a user account for use with the system.

In some examples, the account management engine 518 may be configured to maintain, or otherwise store, account information associated with one or more requested accounts. The account information may include account holder information, a user ID, a password, acceptable answers to challenge questions, etc. In this regard, users may be authenticated when accessing and/or utilizing the website.

In some examples, the location engine 520 may be configured to track and determine locations of the objects in the facility including the locations of the users and the items. In some examples, the location engine determines the location of the storage location where a user places items and communicates the location for association with the user account of the individual.

In some examples, the user notification engine 522 may be configured to provide notifications to users regarding their items such as reminders of items that may have been forgotten or left behind. In some examples, such notifications or other notifications, such as drop-off and pick-up alerts may be communicated to a mobile device associated with the user account.

In some examples, the access engine 524 may be configured to engage and disengage access to the storage locations as described herein. For example, the access engine 524 may receive a signal indicating that a user associated with a locked storage location is approaching the location and subsequently causes or triggers the storage location to unlock so the user can access the items inside without requiring any action from the user.

In some examples, the availability engine 526 may be configured to determine availability of storage locations and provide such availability information to a mobile device so that a user may view current availability and options for storing items before proceeding.

In some examples, the reservation engine 528 may be configured to enable a user to reserve a particular storage location, such as a location having particular size, shape, or characteristics such as refrigeration or other such storage location characteristics to ensure that the location will be available when the user arrives. The location may be secured when reserved, though empty, and be unlocked when the use arrives to deposit items.

In some examples, the reporting engine 530 may be configured to generate reports, such as audit logs relating to access to particular storage locations by individuals within the facility. The audit logs may include timestamps, locations accessed, user identifiers, and other such information. The reporting engine 530 may also store and/or report use data for the facility. The use data for the facility may include information related to how often storage locations are being used and/or accessed as well as other use data related to how users are interacting with the storage locations. The use data from the reporting engine 530 may be used to refine the arrangement, configuration, or uses for the facility. The reporting engine 530 may also handle reporting of troubleshooting and/or handling of requests for assistance from users, for example if there is a system malfunction, the reporting engine 530 may communicate the troubleshooting request to a service manager or operator of the facility.

Figure 6:
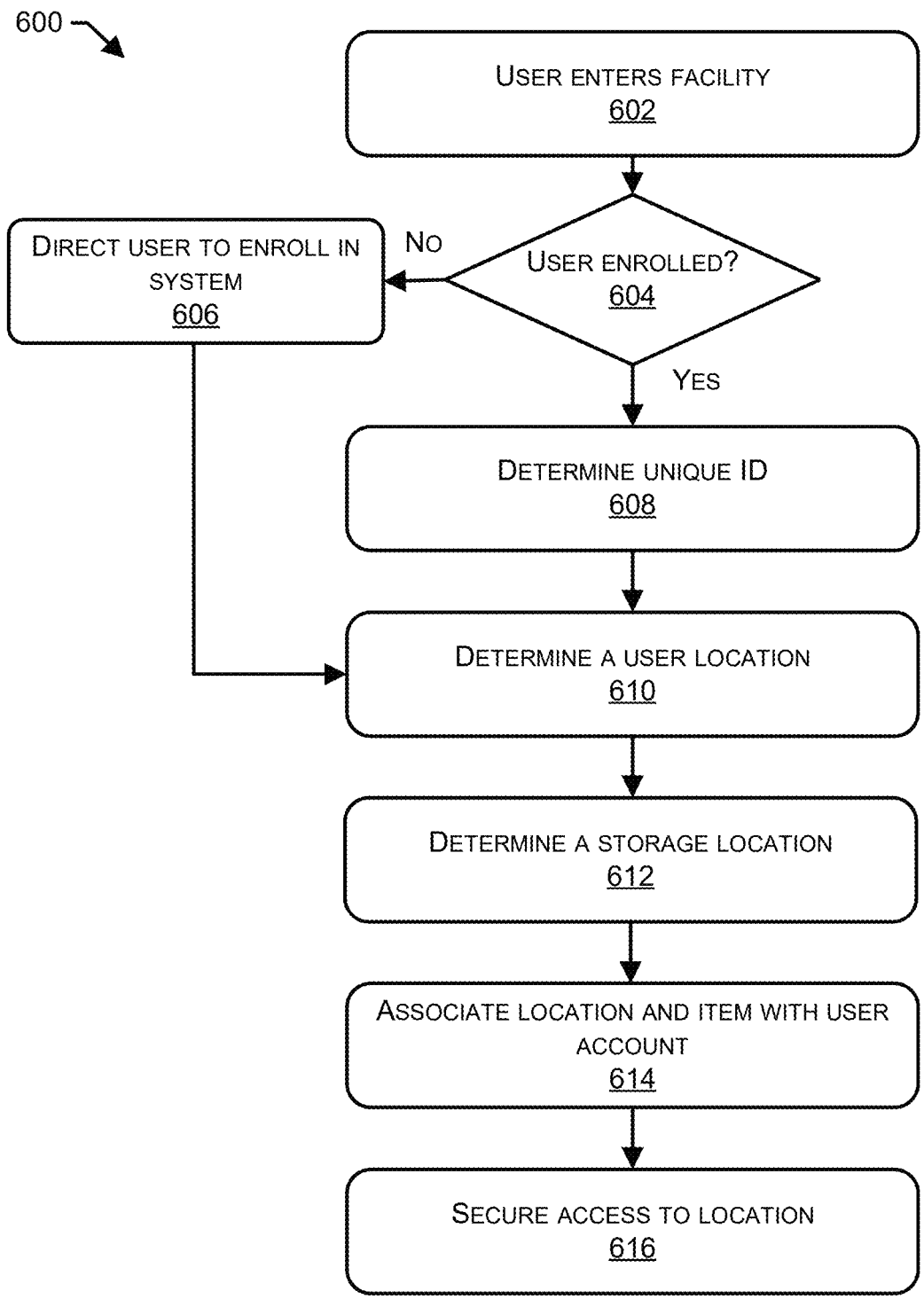
FIG. 6 illustrates an example process for securely storing items at a facility without performing a manual check-in or manual check-out process, according to at least one example.
Figure 7:
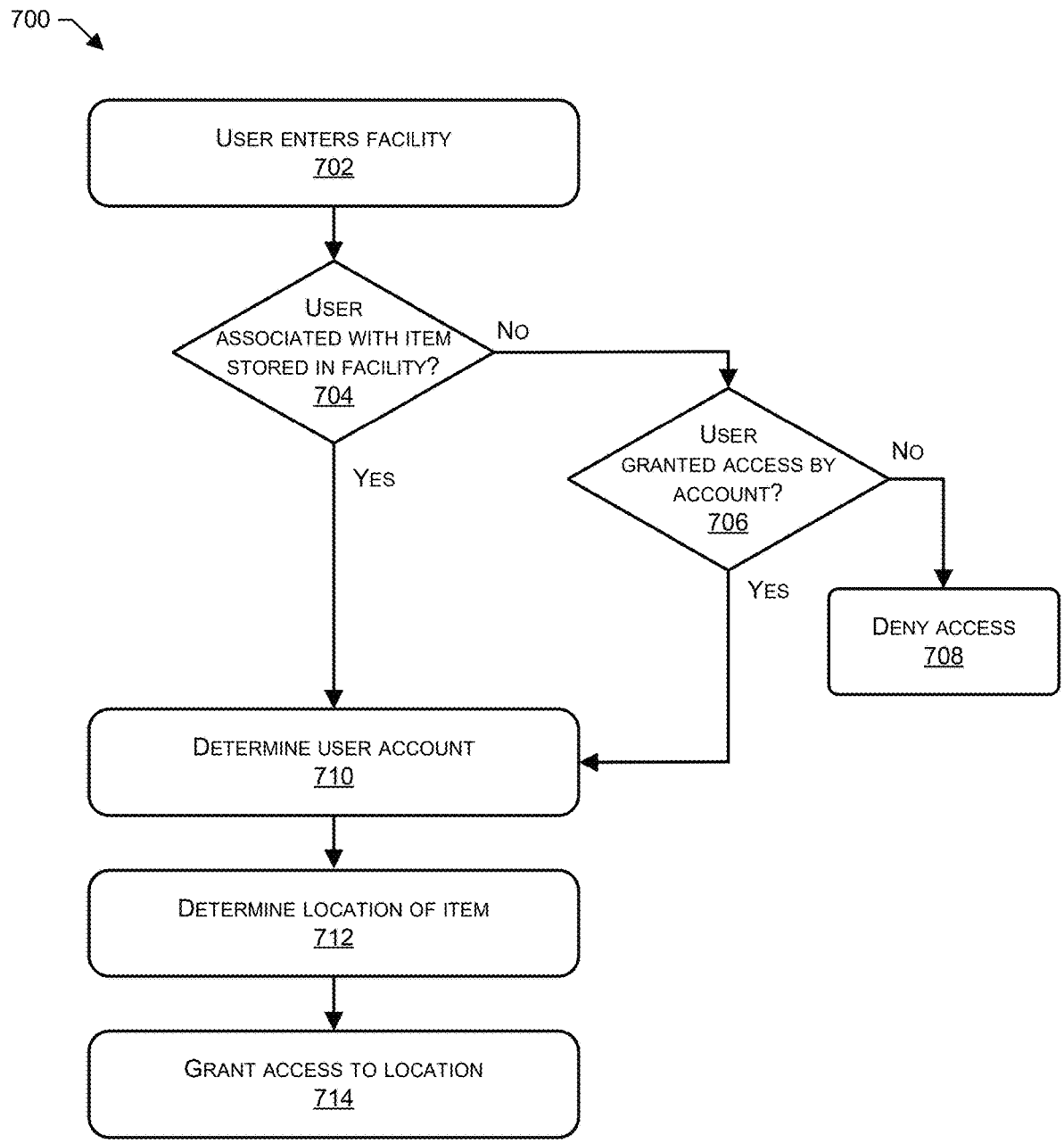
FIG. 7 illustrates an example process for securely storing items at a facility without performing a manual check-in or manual check-out process, according to at least one example.

FIGS. 6 and 7 illustrate flow diagrams of example processes 600 and 700 for generating keywords from multilingual data for use in item categorization, according to at least some examples. The processes described herein are illustrated as collections of blocks in logical flow diagrams, which represent a sequence of operations, some, or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform functions or implement data types. The order in which the blocks are described should not be construed as a limitation, unless specifically noted. Any number of the described blocks may be combined in any order and/or in parallel to implement the process, or alternative processes, and not all the blocks need be executed. For discussion purposes, the processes are described with reference to the environments, architectures and systems described in the examples herein, such as, for example those described with respect to FIGS. 1-5, although the processes may be implemented in a wide variety of other environments, architectures, and systems. The order in which the operations or steps are described is not intended to be construed as a limitation, and any number of the described operations may be combined in any order and/or in parallel to implement process 500.

FIG. 6 illustrates a process 600 for securely storing items at a facility without performing a manual check-in or manual check-out process, according to at least one example.

At 602, the process 600 includes determining that a user enters a facility, such as the facility 100. The user may provide information to authenticate themself such as biometric data, credit card data, mobile device data, or other such information. As described herein, an entry gate may provide access to the facility.

At 604, the process 600 includes determining if the user is enrolled in a user account associated with the facility. In the event that the user is not enrolled with a user account, at 606, the process 600 includes directing the user to enroll in the system. If the user is enrolled, then at 608, the process 600 includes determining a unique identifier associated with the user based on information or data from the user upon their entry at the facility. For example the unique identifier may include a user account, credit card, key fob, passcode, or other such unique identifying information for the user.

At 610, the process 600 includes determining a user location within the facility. The location of the user and/or location of one or more items carried by the user may be tracked by sensors of the facility. The location of the user may be tracked for audit purposes within the facility, as well as to enable locking and/or unlocking of a storage location based on user proximity to the location.

At 612, the process 600 includes determining a storage location where the user places an item within the facility. In some examples, sensor data may include data at the storage locations indicating that the user has placed an item in the location, such as a weight sensor. Additionally, the system may identify a number of items and one or more characteristics of items brought in by the user for storage at the location based on visual or other identifiable characteristics.

At 614, the process 600 includes associating the location and item characteristics with the user account of the user. The location may be logged in association with the user account such that the user has unique access to the location but other users may not have access to the location while in use with the items stored by the user.

At 616, the process 600 includes securing access to the location. The location may be secured by actuating a lock in response to the user departing from the storage location and/or leaving the facility.

FIG. 7 illustrates a process 700 for securely storing items at a facility without performing a manual check-in or manual check-out process, according to at least one example.

At 702, the process 600 includes determining that a user enters a facility, such as the facility 100. The user may provide information to authenticate themself such as biometric data, credit card data, mobile device data, or other such information. As described herein, an entry gate may provide access to the facility. The user may have previously entered the facility and stored an item, as described with respect to FIG. 6 or may be an authorized pick-up individual who has access to pick-up an item stored by a different user at a previous time.

At 704, the process 700 includes determining if the user is associated with an item stored in the facility. The user may have previously stored an item within the facility and may be identified based on their authorization information as the user who has an item in the facility.

In the event that the user is not associated with an item stored at the facility, that is, the user is not a user who placed an item at a storage location, at 706, the process 700 includes determining if the user was granted access by a separate account. The system may determine if the user identified upon entering the facility is an authorized pick-up individual associated with a different user account. In the event that the user is not granted access by another account, at 708, the facility and/or the storage locations may deny access to the items by the user. After the user is determined to be associated with an account, at 710, the process 700 includes determining the user account and associated locations where items are stored in the facility. In some examples, the locations may be displayed or output on a mobile device of the user and/or a display of the facility for the user to view and aid them in navigating to the storage location.

At 712, the process 700 includes determining the location of the item. The location of the item is based on the tracked location of the user and the associated storage location where the item was placed, the item being associated with the user account.

At 714, the process 700 includes granting access to the location. The access may be granted by unlocking a system as the user approaches and/or enabling an exit gate to open or unlock when the user approaches with the items from the location (e.g., the items associated with the user account). In this manner, users may leave with only items they are authorized to access but do not require physical keys or codes to access the items.

Figure 8:
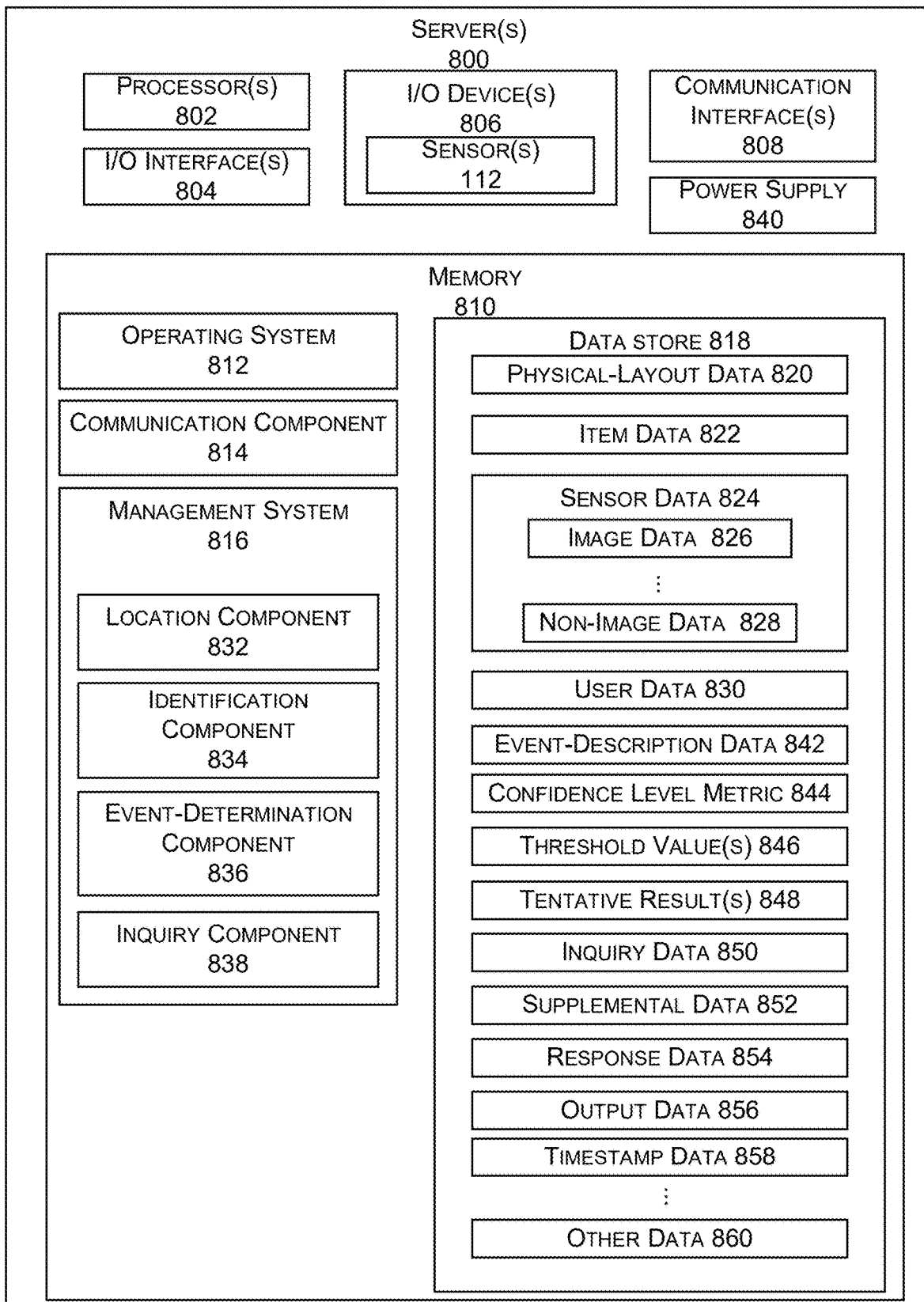
FIG. 8 illustrates a block diagram of one or more servers configured to support operation of the facility, according to at least one example.

FIG. 8 illustrates a block diagram of one or more servers 800 configured to support operation of the facility, according to at least one example. The servers 800 may be physically present at the facility 100, may be accessible by the network 110, or a combination of both. The servers 800 do not require end-user knowledge of the physical location and configuration of the system that delivers the services. Common expressions associated with the servers 800 may include "on-demand computing," "software as a service (SaaS)," "cloud services," "data centers," and so forth. Services provided by the servers 800 may be distributed across one or more physical or virtual devices.

The servers 800 may include one or more hardware processors 802 (processors) configured to execute one or more stored instructions. The processors 802 may comprise one or more cores. The servers 800 may include one or more input/output (I/O) interface(s) 804 to allow the processor 802 or other portions of the servers 800 to communicate with other devices. The I/O interfaces 804 may comprise Inter-Integrated Circuit (I2C), Serial Peripheral Interface bus (SPI), Universal Serial Bus (USB) as promulgated by the USB Implementers Forum, and so forth.

The servers 800 may also include one or more communication interfaces 1208. The communication interfaces 808 are configured to provide communications between the servers 800 and other devices, such as the sensors 112, the interface devices, routers, and so forth. The communication interfaces 808 may include devices configured to couple to personal area networks (PANs), wired and wireless local area networks (LANs), wired and wireless wide area networks (WANs), and so forth. For example, the communication interfaces 808 may include devices compatible with Ethernet, Wi-Fi™, and so forth. The servers 800 may also include one or more busses or other internal communications hardware or software that allow for the transfer of data between the various modules and components of the servers 800.

The servers 800 may also include a power supply 840. The power supply 840 is configured to provide electrical power suitable for operating the components in the servers 800.

The servers 800 may further include one or more memories 810. The memory 810 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 810 provides storage of computer-readable instructions, data structures, program modules, and other data for the operation of the servers 800. A few example functional modules are shown stored in the memory 810, although the same functionality may alternatively be implemented in hardware, firmware, or as a system on a chip (SOC).

The memory 810 may include at least one operating system (OS) component 812. The OS component 812 is configured to manage hardware resource devices such as the I/O interfaces 804, the communication interfaces 808, and provide various services to applications or components executing on the processors 802. The OS component 812 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 810. These components may be executed as foreground applications, background tasks, daemons, and so forth. A communication component 814 may be configured to establish communications with one or more of the sensors 112, one or more of the devices used by associates, other servers 800, or other devices. The communications may be authenticated, encrypted, and so forth.

The memory 810 may store a management system 816. The management system 16 is configured to provide the functions as described herein with regard to the management system 414. For example, the management system 816 may track movement of items in the facility 100, generate user interface data, and so forth.

The management system 816 may access information stored in one or more data stores 818 in the memory 810. The data store 818 may use a flat file, database, linked list, tree, executable code, script, or other data structure to store the information. In some implementations, the data store 818 or a portion of the data store 818 may be distributed across one or more other devices including other servers 800, network attached storage devices, and so forth.

The data store 818 may include physical layout data 820. The physical layout data 820 provides a mapping of physical locations within the physical layout of devices and objects such as the sensors 112, storage locations 102, and so forth. The physical layout data 820 may indicate the coordinates within the facility 100 of a storage location 102, sensors 112 within view of that storage location 102, and so forth. For example, the physical layout data 820 may include camera data comprising one or more of a location within the facility 100 of a sensor 112(1), orientation of the sensor 112(1), the operational status, and so forth. Continuing example, the physical layout data 820 may indicate the coordinates of the sensor 112(1), pan and tilt information indicative of a direction that the field of view 114 is oriented along, whether the sensor 112(1) is operating or malfunctioning, and so forth.

In some implementations, the inventory management system 816 may access the physical layout data 820 to determine if a location associated with the event is within the field of view of one or more sensors 112. Continuing the example above, given the location within the facility 100 of the event and the camera data, the inventory management system 816 may determine the sensors 112(1) that may have generated images of the event.

The item data 822 comprises information associated with the items 104. The information may include information indicative of one or more storage locations 102 at which one or more of the items 104 are stored. The item data 822 may also include event data, SKU or other product identifier, price, quantity on hand, weight, expiration date, images of the item 104, detail description information, ratings, ranking, and so forth. Still, in some instances, the item data 822 may include device data that associated items with devices that are used to track the locations of the items within the facility 100. The inventory management system 816 may store information associated with inventory management functions in the item data 822.

The data store 818 may also include sensor data 824. The sensor data 824 comprises information acquired from, or based on, the one or more sensors 112. For example, the sensor data 824 may comprise 3D information about an object in the facility 100. As described above, the sensors 112 may include a sensor 112(1), which is configured to acquire one or more images. These images may be stored as the image data 826. The image data 826 may comprise information descriptive of a plurality of picture elements or pixels. Non-image data 828 may comprise information from other sensors 112, such as input from microphones, weight sensors, and so forth.

User data 830 may also be stored in the data store 818. The user data 830 may include identity data, information indicative of a profile, purchase history, location data, demographic data, and so forth. Individual users 116 or groups of users 116 may selectively provide user data 830 for use by the management system 414. The individual users 116 or groups of users 116 may also authorize collection of the user data 830 during use of the facility 100 or access to user data 830 obtained from other systems. For example, the user 116 may opt-in to collection of the user data 830 to receive enhanced services while using the facility 100.

The inventory management system 816 may include one or more of a location component 832, identification component 834, event-determination component 836, and inquiry component 838, potentially amongst other components 856.

The location component 832 functions to locate items or users within the environment of the facility to allow the management system 816 to assign certain events to the correct users. That is, the location component 832 may assign unique identifiers to users as they enter the facility and, with the users' consent, may locate the users throughout the facility 100 over the time they remain in the facility 100. The location component 832 may perform this locating using sensor data 824, such as the image data 826. For example, the location component 832 may receive the image data 826 and analyze the image data 826 to identify users from the images. After identifying a particular user within the facility, the location component 832 may then locate the user within the images as the user moves throughout the facility 100. Further, should the location component 832 temporarily "lose" a particular user, the location component 832 may again attempt to identify the users within the facility based on facial recognition, and/or using other techniques such as voice recognition, or the like.

Therefore, upon receiving the indication of the time and location of the event in question, the location component 832 may query the data store 818 to determine which one or more users were at or within a threshold distance of the location of the event at the particular time of the event. Further, the location component 832 may assign different confidence levels to different users, with the confidence levels indicating how likely it is that each corresponding user is the user that is in fact associated with the event of interest.

The location component 832 may access the sensor data 824 in order to determine this location data of the user and/or items. The location data provides information indicative of a location of an object, such as the item, the user, and so forth. The location may be absolute with respect to the facility 100 or relative to another object or point of reference. Absolute terms may comprise a latitude, longitude, and altitude with respect to a geodetic reference point. Relative terms may include a location of 210.4 meters (m) along an x-axis and 710.2 m along a y-axis as designated by a floor plan of the facility 100, 10.2 m from a storage location 102 along a heading of 110°, and so forth. For example, the location data may indicate that the user is 210.2 m along the aisle and standing in front of the storage location 102. In comparison, a relative location may indicate that the user is 32 cm from the storage location 102 at a heading of 73° with respect to the storage location 102. The location data may include orientation information, such as which direction the user is facing. The orientation may be determined by the relative direction the user's body is facing. In some implementations, the orientation may be relative to the interface device. Continuing the example, the location data may indicate that the user is oriented with a heading of 0°, or looking north. In another example, the location data may indicate that the user is facing towards the interface device.

The identification component 834 is configured to identify an object. In one implementation, the identification component 834 may be configured to identify an item. In another implementation, the identification component 834 may be configured to identify an identifier associated with the user. For example, the identification component 834 may process the image data 826 and determine the identity data of the user depicted in the images by comparing the characteristics in the image data 826 with previously stored results. The identification component 834 may also access data from other sensors 112, such as from an RFID reader, an RF receiver, fingerprint sensors, and so forth.

The event-determination component 836 is configured to process the sensor data 824 and generate output data, and may include components described above. The event-determination component 836 may access information stored in the data store 818 including, but not limited to, event-description data 842, confidence levels 844, or threshold values. In some instances, the event-determination component 836 may be configured to perform some or all of the techniques described above with regards to the event-determination component 836. For instance, the event-determination component 836 may be configured to create and utilize event classifiers for identifying events (e.g., predefined activity) within image data, potentially without use of other sensor data acquired by other sensors in the environment.

The event-description data 842 comprises information indicative of one or more events 1124. For example, the event-description data 842 may comprise predefined profiles that designate movement of an item from a storage location 102 with the event of "pick-up". The event-description data 842 may also include a profile with an event to "drop-off." The event-description data 842 may be manually generated or automatically generated. The event-description data 842 may include data indicative of triggers associated with events occurring in the facility 100. An event may be determined as occurring upon detection of the trigger. For example, sensor data 824 such as a change in weight from a sensor 112 at a storage location 102 may trigger detection of an event of an item being added or removed from the storage location 102. In another example, the trigger may comprise an image of the user reaching a hand toward the storage location 102. In yet another example, the trigger may comprise two or more users 116 approaching to within a threshold distance of one another.

The event-determination component 836 may process the sensor data 824 using one or more techniques including, but not limited to, artificial neural networks, classifiers, decision trees, support vector machines, Bayesian networks, and so forth. For example, the event-determination component 836 may use a decision tree to determine occurrence of the "pick-up" event based on sensor data 824. The event-determination component 836 may further use the sensor data 824 to determine one or more tentative results 848. The one or more tentative results 848 comprise data associated with the event. For example, where the event comprises a disambiguation of users, the tentative results 848 may comprise a list of possible user identities. In another example, where the event comprises a disambiguation between items, the tentative results 848 may comprise a list of possible item identifiers. In some implementations, the tentative result 848 may indicate the possible action. For example, the action may comprise the user picking, placing, moving an item, damaging an item, providing gestural input, and so forth.

In some implementations, the tentative results 848 may be generated by other components. For example, the tentative results 848 such as one or more possible identities or locations of the user involved in the event may be generated by the location component 832. In another example, the tentative results 848 such as possible items that may have been involved in the event may be generated by the identification component 834.

The event-determination component 836 may be configured to provide a confidence level 844 associated with the determination of the tentative results 848. The confidence level 844 provides indicia as to the expected level of accuracy of the tentative result 848. For example, a low confidence level may indicate that the tentative result 848 has a low probability of corresponding to the actual circumstances of the event. In comparison, a high confidence level may indicate that the tentative result 848 has a high probability of corresponding to the actual circumstances of the event.

In some implementations, the tentative results 848 having confidence levels 844 that exceed the threshold may be deemed to be sufficiently accurate and thus may be used as the output data. For example, the event-determination component 836 may provide tentative results 848 indicative of the three possible items corresponding to the "pick-up" event. The confidence levels 844 associated with the possible items may be, for example, 21%, 70%, 12%, respectively. Continuing the example, the threshold value may be set such that confidence level 44% of 100% are deemed to be sufficiently accurate. As a result, the event-determination component 836 may designate the "pick-up" event as involving a particular item.

The inquiry component 838 may be configured to use at least a portion of the sensor data 824 associated with the event to generate inquiry data 850. In some implementations, the inquiry data 850 may include one or more of the tentative results 848 or supplemental data 852. The inquiry component 838 may be configured to provide inquiry data 850 to one or more devices associated with one or more human associates.

An associate user interface is presented on the respective devices of associates. The associate may generate response data 854 by selecting a tentative result 848, entering new information, indicating that they are unable to answer the inquiry, and so forth.

The supplemental data 852 comprises information associated with the event or that may be useful in interpreting the sensor data 824. For example, the supplemental data 852 may comprise previously stored images of the items. In another example, the supplemental data 852 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 826 during presentation to an associate.

The inquiry component 838 processes the response data 854 provided by the one or more associates. The processing may include calculating one or more statistical results associated with the response data 854. For example, statistical results may include a count of the number of times associates selected a tentative result 848, determination of a percentage of the associates that selected a tentative result 848, and so forth.

The inquiry component 838 is configured to generate the output data based at least in part on the response data 854. For example, given that a majority of the associates returned response data 854 indicating that the item associated with the "pick-up" event is item, the output data may indicate that the item was picked up.

The inquiry component 838 may be configured to selectively distribute inquiries to particular associates. For example, some associates may be better suited to answering particular types of inquiries. Performance data, such as statistical data about the performance of the associates, may be determined by the inquiry component 838 from the response data 854 provided by the associates. For example, information indicative of a percentage of different inquiries in which the particular associate selected response data 854 that disagreed with the majority of associates may be maintained. In some implementations, test or practice inquiry data having a previously known correct answer may be provided to the associate for training or quality assurance purposes. The determination of the set of associates to use may be based at least in part on the performance data.

By using the inquiry component 838, the event-determination component 836 may be able to provide high reliability output data that accurately represents the event. The output data generated by the inquiry component 838 from the response data 854 may also be used to further train the automated systems used by the inventory management system 816. For example, the sensor data 824 and the output data, based on response data 854, may be provided to one or more of the components of the inventory management system 816 for training in process improvement. Continuing the example, this information may be provided to an artificial neural network, Bayesian network, and so forth, to further train these systems such that the confidence level 844 and the tentative results 848 produced in the future for the same or similar input is improved. In some instances, the servers 800 may further store the timestamp data 858, timestamp data 858 representing locations of users over time, and other data 860.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

The invention claimed is:

1. A system comprising:
one or more cameras located within a facility configured to generate image data representing a user within the facility;
one or more processors; and
one or more computer-readable media storing instructions that, when executed by the one or more processors, cause the one or more processors to perform operations comprising:
receiving first sensor data associated with the user entering the facility at a first time;
determining a unique identifier associated with the user based at least in part on the first sensor data;
receiving second sensor data from the one or more cameras indicating an event comprising a user interaction with an item and a storage location within the facility;
determining a location within the facility for the storage location;
securing the item within the facility in response to the user exiting the facility, wherein the item is not accessible to a second user different from the user;
receiving third sensor data associated with the user returning to the facility at a second time later than the first time;
determining a unique identifier account based at least in part on the third sensor data; and
releasing the item in response to determining that the user approaches the storage location based at least in part on fourth sensor data.

2. The system of claim 1, wherein the system comprises securable doors providing access to respective storage compartments, and wherein securing the item comprises locking the securable doors, the securable doors unlockable in response to the user entering the facility and approaching the storage location.

3. A method comprising:
determining a unique identifier associated with a user within a facility based at least in part on first sensor data;
receiving a message from a mobile device associated with the unique identifier at a time prior to the user entering the facility, the message comprising a request to reserve a storage location;
reserving access to the storage location based at least in part on the message by preventing subsequent users to place an item at the storage location;
determining a location of an event within the facility based at least in part on second sensor data, the event comprising a user deposit of an item;
determining a user permission for accessing the item at the location; and
securing the item within the facility in response to the user exiting the facility, wherein the item is not accessible to a second user having a second unique identifier with second user permission different from the user permission.

4. The method of claim 3, further comprising determining a user location within the facility, and wherein securing the item comprises locking an access control to the location automatically in response to the user being more than a threshold distance away from the location, the access control lockable based on a determination of the unique identifier of the user and a proximity of the user to the access control.

5. The method of claim 4, wherein:
determining the user location comprises receiving third sensor data from one or more cameras within the facility;
determining a token associated with a representation of the user within the third sensor data; and
the proximity of the user to the access control is based at least in part on the token.

6. The method of claim 3, wherein securing the item comprises closing and locking an access gate providing access into at least a portion of the facility comprising the location, the access gate unlockable based at least on the unique identifier in response to the user being within a threshold distance of the access gate.

7. The method of claim 3, further comprising enabling access to the location based at least in part on:
the user approaching the location;
identifying the user based at least in part on image data from one or more cameras of the facility; and
determining the unique identifier in response to identifying the user.

8. The method of claim 7, wherein enabling access based at least in part on the user approaching the location comprises unlocking an access control providing access to the location based at least in part on proximity of the user to the location.

9. The method of claim 3, further comprising the user accessing the item by approaching a secure storage location, the secure storage location different from the location and in response to the user approaching the secure storage location.

10. The method of claim 3, further comprising determining an audit log of accesses to the facility and the location and associated unique identifiers of users who accessed the facility and the location.

11. The method of claim 3, further comprising generating a notification to a mobile device associated with the unique identifier, the notification comprising information regarding the location or a pickup time for the item.

12. The method of claim 3, further comprising determining a secondary user to access the location based at least in part on a message from a mobile device associated with the unique identifier, the secondary user receiving permission to access the location by approaching the location and being identified based at least in part on sensor data from one or more cameras of the facility.

13. A system comprising:
one or more processors; and
one or more computer-readable media storing instructions that, when executed by the one or more processors, cause the one or more processors to perform operations comprising:
determining a unique identifier associated with a user within a facility based at least in part on first sensor data;
determining a location of an event within the facility based at least in part on second sensor data, the event comprising a user deposit of an item;
determining a user permission for accessing the item at the location;
securing the item within the facility in response to the user exiting the facility, wherein the item is not accessible to a second user having a second unique identifier with second user permission different from the user permission;
receiving third sensor data associated with the user returning to the facility at a second time later than the first time;
determining a unique identifier account based at least in part on the third sensor data; and
releasing the item in response to determining that the user approaches the location based at least in part on fourth sensor data.

14. The system of claim 13, wherein the operations further comprise:
determining a user location within the facility, and wherein securing the item comprises locking an access control to the location automatically in response to the user being more than a threshold distance away from the location, the access control lockable based on a determination of the unique identifier of the user and a proximity of the user to the access control.

15. The system of claim 13, the operations further comprising:
enabling access to the location based at least in part on:
the user approaching the location;
identifying the user based at least in part on image data from one or more cameras of the facility; and
determining the unique identifier in response to identifying the user.

16. The system of claim 15, wherein enabling access based at least in part on the user approaching the location comprises unlocking an access control providing access to the location based at least in part on proximity of the user to the location.

17. The system of claim 13, wherein securing the item comprises closing and locking an access gate providing access into at least a portion of the facility comprising the location, the access gate unlockable based at least on the unique identifier in response to the user being within a threshold distance of the access gate.

18. The system of claim 13, the operations further comprising determining an audit log of accesses to the facility and the location and associated unique identifiers of users who accessed the facility and the location.

* * * * *